US008750913B2

(12) United States Patent
Khayrallah et al.

(10) Patent No.: US 8,750,913 B2
(45) Date of Patent: Jun. 10, 2014

(54) ASYMMETRIC RESOURCE SHARING USING STALE FEEDBACK

(75) Inventors: Ali S. Khayrallah, Mountain View, CA (US); Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 166 days.

(21) Appl. No.: 13/324,645

(22) Filed: Dec. 13, 2011

(65) Prior Publication Data

US 2013/0148634 A1    Jun. 13, 2013

(51) Int. Cl.
    H04B 7/06    (2006.01)
(52) U.S. Cl.
    CPC .................................... *H04B 7/0691* (2013.01)
    USPC .......................................... 455/509; 370/339
(58) Field of Classification Search
    CPC .. H04B 7/0413; H04B 7/0613; H04B 7/0417;
                          H04B 7/0691; H04B 7/0693
    USPC ............ 370/252, 339, 430; 455/450, 17, 500,
                                                                455/509
    See application file for complete search history.

(56) References Cited

U.S. PATENT DOCUMENTS

| 6,600,934 | B1 * | 7/2003 | Yun et al. ..................... 455/562.1 |
| 6,731,619 | B1 * | 5/2004 | Ramesh et al. ................. 370/334 |
| 2006/0035605 | A1 * | 2/2006 | Ozluturk et al. .............. 455/101 |
| 2007/0041457 | A1 * | 2/2007 | Kadous et al. ................ 375/260 |
| 2007/0053282 | A1 * | 3/2007 | Tong et al. .................... 370/208 |
| 2008/0075187 | A1 * | 3/2008 | Sutskover ...................... 375/267 |
| 2010/0290555 | A1 * | 11/2010 | Mege ............................ 375/295 |

OTHER PUBLICATIONS

Larsson, P., et al., "Multi-User ARQ", IEEE VTC, Spring 2006, pp. 2052-2057.
Ali, M., et al., "Completely Stale Transmitter Channel State Information is Still Very Useful", Allerton Conference, 2010, pp. 1-19, Retrieved from http://arxiv.org/abs/1010.1499.
Adhikary, A., et al., "Multi-User MIMO with outdated CSI: Training, Feedback and Scheduling", Forty-Ninth Annual Allerton Conference on Communication, Control, and Computing, IEEE, Sep. 28, 2011, pp. 886-893, Allerton House, UIUC, Illinois, USA, XP032085641.
Ali, M., et al., "Completely Stale Transmitter Channel State Information is Still Very Useful", Forty-Eighth Annual Allerton Conference on Communication, Control, and Computing, IEEE, Sep. 29, 2010, pp. 1188-1195, Allerton House, UIUC, Illinois, USA, XP031899520.

* cited by examiner

*Primary Examiner* — Huy D Vu
*Assistant Examiner* — Benjamin Lamont
(74) *Attorney, Agent, or Firm* — Coats & Bennett, P.L.L.C.

(57) ABSTRACT

With the asymmetric resource sharing disclosed herein, a base station transmits fewer information symbols at some transmission times to one or more mobile terminals than to other mobile terminals at other transmission times. After transmitting the information symbols, the base station receives channel estimates from the mobile terminals, which the base station then use to generate synthesized signals representing estimates of the signals received at the mobile terminals. The base station subsequently combines complementary pairs of the synthesized signals to generate combined signals and transmits at least one of the combined signals to implement at least one virtual antenna for at least one of the mobile terminals.

17 Claims, 3 Drawing Sheets

ASYMMETRIC RESOURCE SHARING USING STALE FEEDBACK

The invention disclosed herein generally relates to virtual diversity reception, and more particularly relates to asymmetric resource sharing for virtual diversity reception.

BACKGROUND

Multi-user downlink systems typically comprise a multi-antenna base station that transmits multiple signals to each of a plurality of single-antenna mobile terminals. Because the mobile terminals typically only have one antenna, the mobile terminals cannot take advantage of simple receive diversity processing techniques. To address this issue, a base station in a multi-user downlink system may use channel state information reported by the mobile terminals to generate additional signals that may be used by the mobile terminals to create a virtual diversity receiver at each mobile station, where the virtual receiver at each mobile station has multiple virtual antennas to enable the mobile station to use linear diversity processing techniques to improve performance. For example, the base station may use previously reported channel state information to estimate signals received by the mobile terminals, where the base station may then use the received signal estimates to generate additional signals for subsequent transmission to the mobile terminals. Upon receipt, the mobile terminals may then use the additional signals to simplify the signal processing required to determine the originally transmitted signals, e.g., by using simple algebraic techniques. Thus, each mobile terminal experiences a performance boost, which may translate into better coverage, higher bit rate, higher cell throughput, etc. "Multi-User ARQ" by P. Larsson and N. Johansson, Vehicular Technology Conference, May 2006, vol. 4, pp. 2052-2057 discloses an exemplary virtual diversity receiver.

For example, a virtual diversity system may include a base station that uses three antennas to transmit information symbols to three single-antenna mobile terminals. After receiving channel estimates representing the channel state information for each of the channels between each of the transmission antennas and each of the mobile terminals at each transmission time, the base station estimates the signals received by the mobile terminals, and combines complementary pairs of the estimated signals to generate three combined signals, which are subsequently transmitted to the mobile terminals during three subsequent transmission times. The mobile terminals then use the originally received signals and the received combined signals to create a simple system of three equations having three unknowns. Each mobile terminal may then algebraically solve the corresponding system of equations to detect the three information symbols originally transmitted to that mobile terminal.

Because the channel may have changed significantly by the time the base station transmits the additional signal(s), the channel state information used to implement virtual diversity reception is generally thought of as stale feedback. However, virtual diversity reception does not rely on channel correlations over time, and therefore effectively assumes the channel is uncorrelated. Thus, the multi-user nature of virtual diversity reception renders stale channel state feedback very useful. "Completely Stale Transmitter Channel State Information is Still Very Useful" by M. Maddah-Ali and D. Tse, Allerton Conference, October 2010 discloses additional details regarding the use of stale channel state information.

Conventional virtual diversity receivers operate in a symmetric fashion, where each mobile terminal acts and benefits equally. As a result, all mobile terminals receive all transmitted signals and feedback all associated channel estimates. While all mobile terminals associated with such symmetric resource sharing benefit equally, implementing symmetric virtual diversity reception may place an unnecessary burden on the required signal processing and signaling overhead. This is especially problematic when all mobile terminals do not require the same benefits and/or overall performance results. Thus, there remains a need for improving the implementation of virtual diversity reception.

SUMMARY

These problems may be addressed with the asymmetric resource sharing method and apparatus disclosed herein. A base station implementing asymmetric resource sharing transmits fewer information symbols at some transmission times to one or more mobile terminals than to other mobile terminals at other transmission times. After transmitting the information symbols, the base station receives channel estimates from the mobile terminals, which the base station then use to generate synthesized signals representing estimates of the signals received at the mobile terminals. The base station subsequently combines complementary pairs of the synthesized signals to generate combined signals and transmits at least one of the combined signals to implement at least one virtual antenna for at least one of the mobile terminals. By transmitting fewer information symbols to some mobile terminals than to others, the base station asymmetrically applies the virtual diversity reception principle to the mobile terminals, which reduces the amount of signal processing, transmitted signals, and signaling overhead while maintaining an acceptable performance at each mobile terminal.

An exemplary method of asymmetric resource sharing implemented at a network node creates one or more virtual antennas for one or more of a plurality of mobile terminals. The method comprises transmitting, at a first time, a first set of information symbols intended for a first mobile terminal from respective antennas, and receiving a first set of channel estimates indicating channel conditions at the first time between the second mobile terminal and the respective antennas. The method further comprises transmitting, at a second time, a second set of information symbols intended for the second mobile terminal from respective antennas, wherein the second set of information symbols comprises fewer information symbols than the first set of information symbols, and receiving a second set of channel estimates indicating channel conditions at the second time between the first mobile terminal and the respective antennas. Further, the method includes computing at least two synthesized signals based on the first and second sets of information symbols and the corresponding channel estimates, where the synthesized signals comprise estimates of signals received by the first and second mobile terminals at the first and second times, combining a first complementary pair of the synthesized signals to generate a first combined signal, and transmitting the first combined signal from one of the antennas to create one or more a virtual antennas for the mobile terminals.

The network node disclosed herein is configured for asymmetric resource sharing to create one or more virtual antennas for one or more of a plurality of mobile terminals. To that end, the network node comprises an information symbol generator, a transmitter, a receiver, a synthesized signal generator, and a combiner. The information symbol generator generates a first set of information symbols intended for a first mobile terminal and a second set of information symbols intended for a second mobile terminal, where the second set of information symbols comprises fewer information symbols than the first set of information symbols. The transmitter transmits, at a first time, the first set of information symbols from respective antennas, and transmits, at a second time, the second set of information symbols from respective antennas. The receiver receives a first set of channel estimates indicating channel conditions at the first time between the second mobile terminal and the respective antennas, and receives a second set of channel estimates indicating channel conditions at the second time between the first mobile terminal and the respective antennas. The synthesized signal generator computes at least two synthesized signals based on the first and second sets of information symbols and the corresponding channel estimates, where the synthesized signals comprise estimates of signals received by the first and second mobile terminals associated with the first and second times. The combiner combines a first complementary pair of the synthesized signals to generate a first combined signal, where the transmitter further transmits the first combined signal from one of the antennas to create one or more virtual antennas for the mobile terminals.

The asymmetric resource sharing method and apparatus disclosed herein applies to base stations with two or more antennas transmitting to two or more mobile terminals, and particularly to base stations with three or more antennas transmitting to three or more mobile terminals.

DETAILED DESCRIPTION

The following description provides methods and apparatus for asymmetric resource sharing using stale channel state information to asymmetrically implement virtual diversity reception for a plurality of mobile terminals. Broadly, a base station implementing the asymmetric resource sharing disclosed herein transmits fewer information symbols to some mobile terminals than to other mobile terminals. In other words, the base station "punctures" information symbols relative to conventional symmetric resource sharing. In so doing, the base station reduces the number of symbol transmissions, and may also reduce the additional signaling required for resource sharing, e.g., the signaling required for feeding back channel estimates and/or transmitting combined signals.

Figure 1:
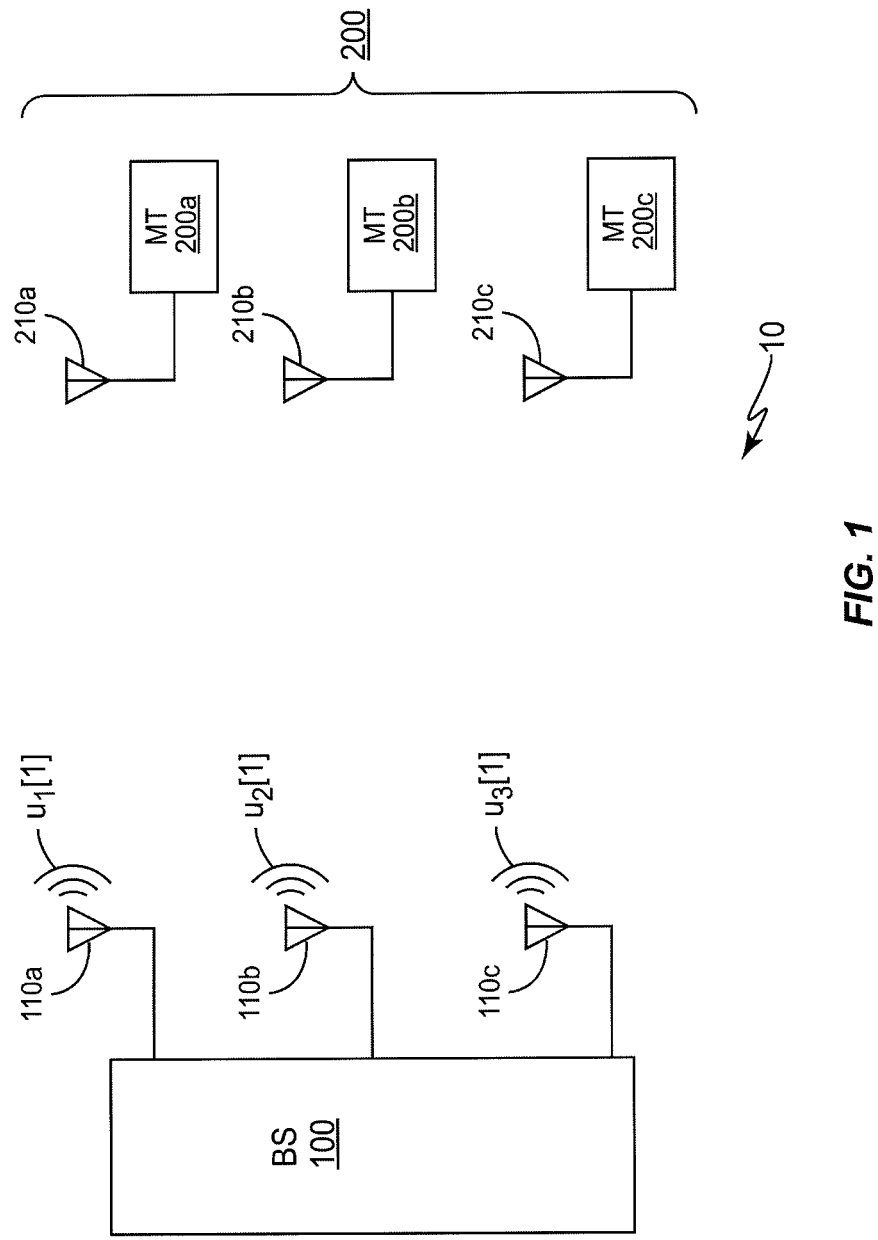
FIG. 1 shows a wireless communication system between a multi-antenna base station and a plurality of single antenna mobile terminals.

Before describing asymmetric resource sharing in further detail, the following first describes conventional symmetric resource sharing as it may be applied to virtual diversity reception. FIG. 1 shows an exemplary wireless system 10 comprising a multi-antenna base station 100 in communication with a plurality of single-antenna mobile terminals, which are generally referred to herein as mobile terminals 200. In this example, base station 100 comprises J=3 antennas 110a, 110b, 110c, generally referred to herein as antennas 110. The antennas 110 transmit information to three single-antenna mobile terminals 200a, 200b, 200c. It will be appreciated that mobile terminals 200 communicate directly with the base station 100, but cannot communicate directly with each other.

Base station 100 transmits a symbol from each antenna 110 during each time interval, where the symbols transmitted at a particular time are intended for a particular mobile terminal 200. For example, at a first time T=1, base station 100 transmits a first set of information symbols from respective antennas 110, where each transmitted information symbol is intended for the first mobile terminal 200a. Subsequently, the base station 100 transmits second and third sets of information symbols from respective antennas, where the information symbols transmitted at time T=2 are intended for the second mobile terminal 200b and the information symbols transmitted at time T=3 are intended for the third mobile terminal 200c.

Even though each of the transmitted symbols are intended for a specific mobile terminal 200, each mobile terminal 200 receives all of the transmitted symbols. Each mobile terminal 200 can detect its intended symbols using non-linear signal processing techniques, e.g., joint demodulation. However, such non-linear techniques are complex and consume too much power and time. Linear signal processing techniques are preferred, but require more information than provided by the signals initially received at the single-antenna mobile terminals 200. For the example in FIG. 1, each mobile terminal 200 requires three received signals associated with a particular transmission time in order to detect the three symbols intended for that mobile terminal 200 using simple algebraic techniques. To solve this problem, conventional symmetric resource sharing uses channel feedback provided by the mobile terminals 200 to implement a virtual diversity system, which creates multiple virtual antennas at each mobile terminal 200. For example, at time T=1, the mobile terminals 200 that are not the target for the transmitted symbols, e.g., the second and third mobile terminals 200b, 200c, feedback channel estimates for the channels between these mobile terminals 200b, 200c and each of the antennas 110a, 110b, 110c. A similar process occurs for times T=2 and T=3. The base station 100 uses the received channel estimates to synthesize the signals received at the mobile terminals 200, and forwards the synthesized signals to the mobile terminals 200 to facilitate virtual diversity reception and linear signal processing.

The following provides a more detailed and mathematical analysis of conventional symmetric resource sharing. In this example, at time T=1 base station 100 transmits three information symbols intended for a first mobile terminal 200a. The first mobile terminal 200a receives the transmitted symbols, as do the other two mobile terminals 200b, 200c. At time T=2, base station 100 transmits three information symbols intended for a second mobile terminal 200b. The second mobile terminal 200b receives the transmitted symbols, as do the other two mobile terminals 200a, 200c. At time T=3, base station 100 transmits three information symbols intended for a third mobile terminal 200c. The third mobile terminal 200c receives the transmitted symbols, as do the other two mobile terminals 200a, 200b. The signals received by the mobile terminals 200 may be represented by:

$$r_i[T] = \sum_j H_{ij}[T]u_j[T] + z_i[T], \quad (1)$$

where $u_j[T]$ represents the information symbol transmitted from antenna j at time T, $H_{ij}[T]$ represents the channel between transmit antenna j and mobile terminal i at time T, $r_i[T]$ represents the signal received at terminal i associated with time T, and $z_i[T]$ represents the noise at mobile terminal i associated with time T. Thus, the signals received by each respective mobile terminal 200a, 200b, 200c at time T=1 comprise:

$$r_1[1]=H_{11}[1]u_1[1]+H_{12}[1]u_2[1]+H_{13}[1]u_3[1]+z_1[1.]$$

$$r_2[1]=H_{21}[1]u_1[1]+H_{22}[1]u_2[1]+H_{23}[1]u_3[1]+z_2[1.]$$

$$r_3[1]=H_{31}[1]u_1[1]+H_{32}[1]u_2[1]+H_{33}[1]u_3[1]+z_3[1.] \qquad (2)$$

where the symbols $u_j[1]$, j=1 to 3, are intended for the first mobile terminal 200a.

Now consider that the first mobile terminal 200a has one received signal $r_1[1]$, containing its intended information symbols. To enable symbol detection using simple linear processing techniques, mobile terminal 200a also needs access to the received signals $r_2[1]$ and $r_3[1]$ received by the other mobile terminals 200b, 200c. Providing mobile terminal 200a with this information requires feedback from the other mobile terminals 200b, 200c to the base station 100, and subsequent transmissions from the base station to deliver the desired information to mobile terminal 200a. The situation is similar for the other two mobile terminals 200. Thus, all three mobile terminals 200 feed back information to the base station 100.

For example, mobile terminal i feeds back the six channel estimates associated with transmitted symbols intended for the other mobile terminals, e.g., $H_{ij}[T]$ for T≠i. For the example in FIG. 1, it is assumed that the fed back channel estimates are available at the base station 100 before time T=4. Base station 100 synthesizes the signals received at each mobile terminal 100 according to:

$$\hat{r}_i[T] = \sum_j H_{ij}[T]u_j[T], \qquad (3)$$

which is equivalent to Equation (1) without the noise. Using Equation (3), base station 100 may synthesize or otherwise recreate each of the signals received by each of the mobile terminals 200, notably $\hat{r}_2[1]$, $\hat{r}_3[1]$, $\hat{r}_1[2]$, $\hat{r}_3[2]$, $\hat{r}_1[3]$, and $\hat{r}_2[3]$.

The base station 100 now has six synthesized values $\hat{r}_i[T]$, T≠i, to transmit to the mobile terminals 200. To minimize the number of additional transmission times needed to transmit the synthesized signals, base station 100 may exploit the multi-user nature of the scenario to efficiently pack information for more than one terminal 200 into combined signals transmitted during the subsequent transmission times. For example, the base station 100 may combine complementary pairs of synthesized signals such that each mobile terminal 200 can recover the information it needs. As used herein, the term "complementary pairs" refer to pairs of signals associated with complementary transmission times and mobile terminals. For example, a complementary pair of signals comprises the synthesized signal for terminal "i" transmitted at time "T," and the synthesized signal for terminal "T" transmitted at time "i." Thus, the base station 100 combines $\hat{r}_i[T]$ (corresponding to the terminal i at time T) and $\hat{r}_T[i]$ (corresponding to the terminal T at time i) to form the combined signal according to:

$$\hat{r}_i[T]+\hat{r}_T[i]. \qquad (4)$$

While "T" and "i" are generally used herein to designate time and mobile terminal, respectively, it will be appreciated that the notation of Equation (4) used above to generally define the complementary pairs of a combined signal, the subscript for the synthesized signal $\hat{r}$ always represents the mobile terminal and the variable in brackets always represents transmission time.

Base station 100 transmits one combined signal per time T. For simplicity and without loss of generality, it is assumed that the combined signals are transmitted from the first antenna 110a (j=1); the other antennas 110b, 110c do not send any information symbols or signals during these subsequent transmission times. The order of transmission does not matter. For instance, the base station may transmit the following combined signals at transmission times T=4, 5, and 6, respectively.

$$u_1[4]=\hat{r}_1[2]+\hat{r}_2[1] \qquad (5)$$

$$u_1[5]=\hat{r}_1[3]+\hat{r}_3[1] \qquad (6)$$

$$u_1[6]=\hat{r}_2[3]+\hat{r}_3[2] \qquad (7)$$

Mobile terminal 200a (i=1) is interested in $u_1[4]$ in Equation (5) because it contains $\hat{r}_2[1]$. Responsive to the transmission of $u_1[4]$ at T=4, mobile terminal 200a receives:

$$r_1[4]=H_{11}[4]u_1[4]+z_1[4]=H_{11}[4](\hat{r}_1[2]+\hat{r}_2[1])+z_1[4] \qquad (8)$$

Mobile terminal 200a can use $r_1[2]$, received earlier with the transmissions of $u_j[2]$, j=1 to 3, to eliminate $\hat{r}_1[2]$ from Equation (8) to obtain:

$$r'_1[4] = r_1[4] - H_{11}[4]r_1[2] \qquad (9)$$

$$= H_{11}[4]\hat{r}_2[1] + (z_1[4] - H_{11}[4]z_1[2])$$

$$= H_{11}[4]\sum_j H_{2j}[1]u_j[1] + (z_1[4] - H_{11}[4]z_1[2])$$

$$= \sum_j H'_{2j}[1]u_j[1] + z'_1[4]$$

where $$H'_{2j}[1]=H_{11}[4]H_{2j}[1] \qquad (10)$$

represents the effective channel, and $z'_1[4]$ represents the effective noise. Thus, $r'_1[4]$ looks like a signal received by a virtual antenna at mobile terminal 200a.

Mobile terminal 200b (i=2) is also interested in $u_1[4]$ because it contains $\hat{r}_1[2]$. The mobile terminal 200b similarly eliminates $\hat{r}_2[1]$ from $r_1[4]$. Continuing with this approach, each mobile terminal 200 ends up with two additional signals received by two virtual antennas. Overall, implementing the conventional virtual diversity system requires six channel uses, i.e., transmission times T=1 to 6, to transmit nine information symbols. The total rate is R=9/6=3/2 symbols per channel use. The individual rate is ρ=1/2 symbols per channel use.

The above example generalizes directly to the case of a base station 100 with J antennas 110 and J single antenna mobile terminals 200. In each of the first J channel uses associated with the J transmission times, the base station 100 transmits J information symbols intended for one mobile terminal 200 from respective antennas, where each antenna 110 transmits one information symbol. The mobile terminals 200 feed back channel estimates, and the base station 100 forms synthesized signals, as in Equation (3). Then base station 100 pairs complementary synthesized signals to form combined signals, as in Equation (4). The base station 100 transmits the combined signals, one at a time in subsequent channel uses associated with subsequent transmission times.

In the general case with J antennas and J mobile terminals 200, each mobile terminal 200 feeds back J(J−1) channel estimates, and the mobile terminals 200 combined feed back $J^2$(J−1) channel estimates. The base station 100 forms J(J−1) synthesized signals, and J(J−1)/2 combined signals. The total number of channel uses comprises the initial J transmissions and the subsequent J(J−1)/2 combined signal transmission, for a total of J(J+1)/2 transmission times/channel uses. The total rate in symbols per channel use is therefore:

$$R = \frac{J^2}{J(J+1)/2} = \frac{2J}{J+1}, \quad (11)$$

and the individual mobile terminal rate is:

$$\rho = \frac{2}{J+1}. \quad (12)$$

The conventional cooperative virtual diversity system described above achieves both a higher total rate and higher individual user rates when compared to non-cooperative systems. For example, if each mobile terminal 200 acts individually, and does not feed back channel estimates to help the base station 100 synthesize received values to benefit other mobile terminals, the base station 100 can only send one symbol to a mobile terminal 200 during each time T to avoid interference. In such non-cooperative systems, the total rate in symbols per channel use is R=1, and the individual rate is ρ=1/J. Thus, as shown by Equations (11) and (12), the simple cooperative virtual diversity system described above achieves both higher total rate and individual user rate.

The conventional symmetric virtual diversity system uses symmetric resource sharing, in the sense that all mobile terminals 200 benefit in the same way. In some cases, it may be beneficial to differentiate between mobile terminals 200, such that some mobile terminals 200 benefit more or less than other mobile terminals 200. To satisfy this goal, the following presents an asymmetric virtual diversity system that uses asymmetric resource sharing. In general, asymmetric virtual diversity systems "puncture" one or more of the information symbols to send fewer information symbols to some mobile terminals 200. The number of required synthesized signals may therefore also become smaller, as may the number of transmitted combined signals. Thus, the asymmetric virtual diversity system may also "puncture" one or more combined signals to reduce the number of transmitted combined signals. As a result, some individual mobile terminal rates are higher than in the baseline symmetric scheme, and some are lower. The following first describes asymmetric virtual diversity for a base station 100 having J=3 antennas 110 transmitting to three single-antenna mobile terminals 200. As subsequently described, asymmetric virtual diversity also applies to a base station 100 having any number of antennas 110.

Figure 2:
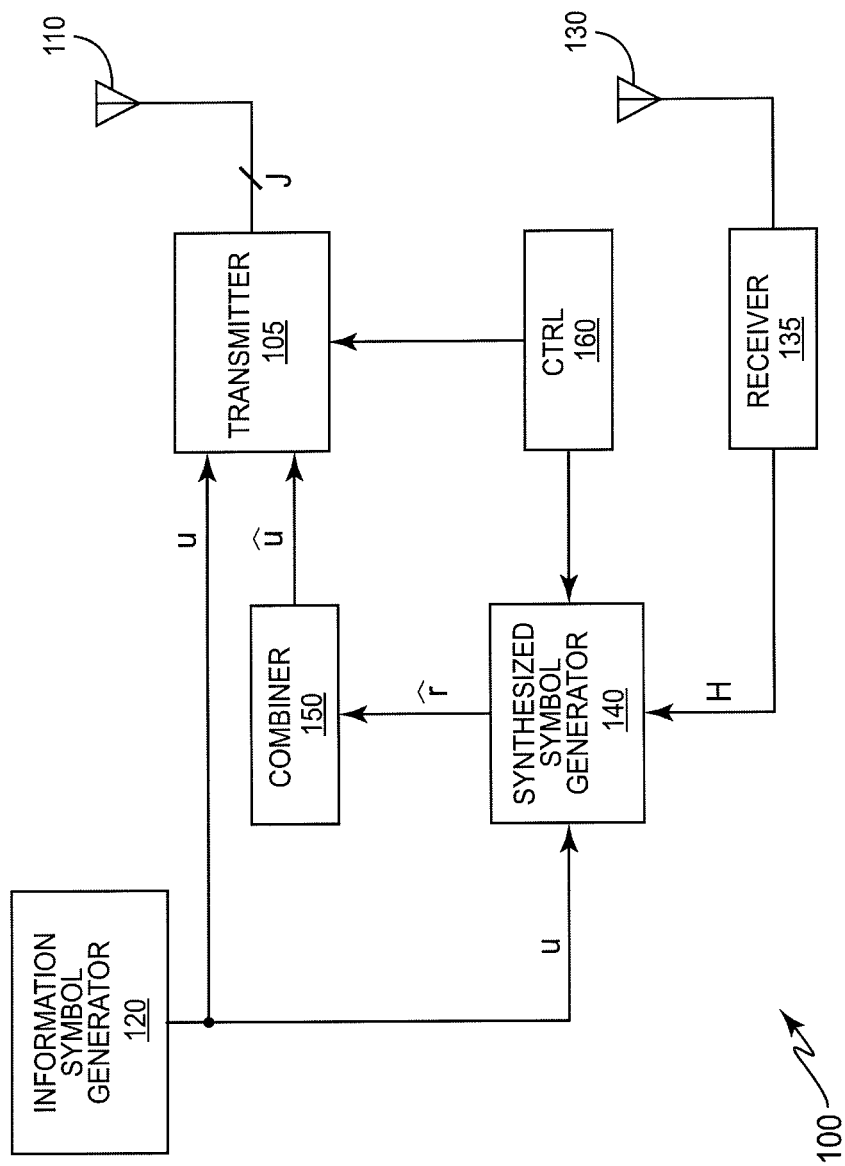
FIG. 2 shows a block diagram of a base station according to one exemplary embodiment.

FIG. 2 shows a block diagram of a base station 100 comprising a transmitter 105, a plurality of transmission antennas 110, an information symbol generator 120, a reception antenna 130, a receiver 135, a synthesized signal generator 140, a combiner 150, and a controller 160. Information symbol generator 120 generates information symbols intended for remote mobile terminals 200. Transmitter 105 transmits the information symbols intended for a particular mobile terminal 200 at a corresponding time via one or more of the transmission antennas 110, where different numbers of information symbols are transmitted at different transmission times.

Reception antenna(s) 130 receive channel estimates from the mobile terminals 200 for each transmission time and provide them to the receiver 135. Receiver 135 provides the channel estimates to the synthesized signal generator 140, which synthesizes signals based on the information symbols generated by the information symbol generator 120 and the channel estimates received by the receiver 135. Each synthesized signal represents an estimate of the signal received by a particular mobile terminal 200 for a particular transmission time. Combiner 150 combines complementary pairs of synthesized signals to generate combined signals for transmission by the transmitter 105 at transmission times following the information symbol transmission times.

In some embodiments, transmitter 105 transmits only those information symbols and combined signals designated by the controller 160. Thus, while information symbol generator 120 and synthesized signal generator 140 may generate all possible information symbols and combined signals, transmitter 105 may transmit only a subset of the generated symbols and/or signals. For example, when J=3 as in FIG. 1, the information signal generator may generate $u_1[1]$, $u_2[1]$, $u_3[1]$, $u_1[2]$, $u_2[2]$, $u_3[2]$, $u_1[3]$, $u_2[3]$, and $u_3[3]$, but transmitter 105 may only transmit $u_1[1]$, $u_2[1]$, $u_3[1]$, $u_1[2]$, $u_2[2]$, $u_1[3]$, and $u_2[3]$ from respective antennas 110. Because they will be punctured, the content of the un-transmitted symbols $u_3[2]$ and $u_3[3]$ is irrelevant. For example, the un-transmitted symbols may be generated as dummy symbols, containing no useful information. The un-transmitted symbols may also be generated as repetitions of other symbols, or generated from the punctured bits of a punctured coding scheme. Alternatively, the transmitter 105 may transmit all generated symbols and/or signals, wherein the information symbol generator 120 and synthesized signal generator 140 only generate those symbols and/or signals designated by the controller 160. For example, information symbol generator 120 may only generate $u_1[1]$, $u_2[1]$, $u_3[1]$, $u_1[2]$, $u_2[2]$, $u_1[3]$, and $u_2[3]$, in which transmitter 105 will transmit all of the generated symbols from respective antennas 110.

Figure 3:
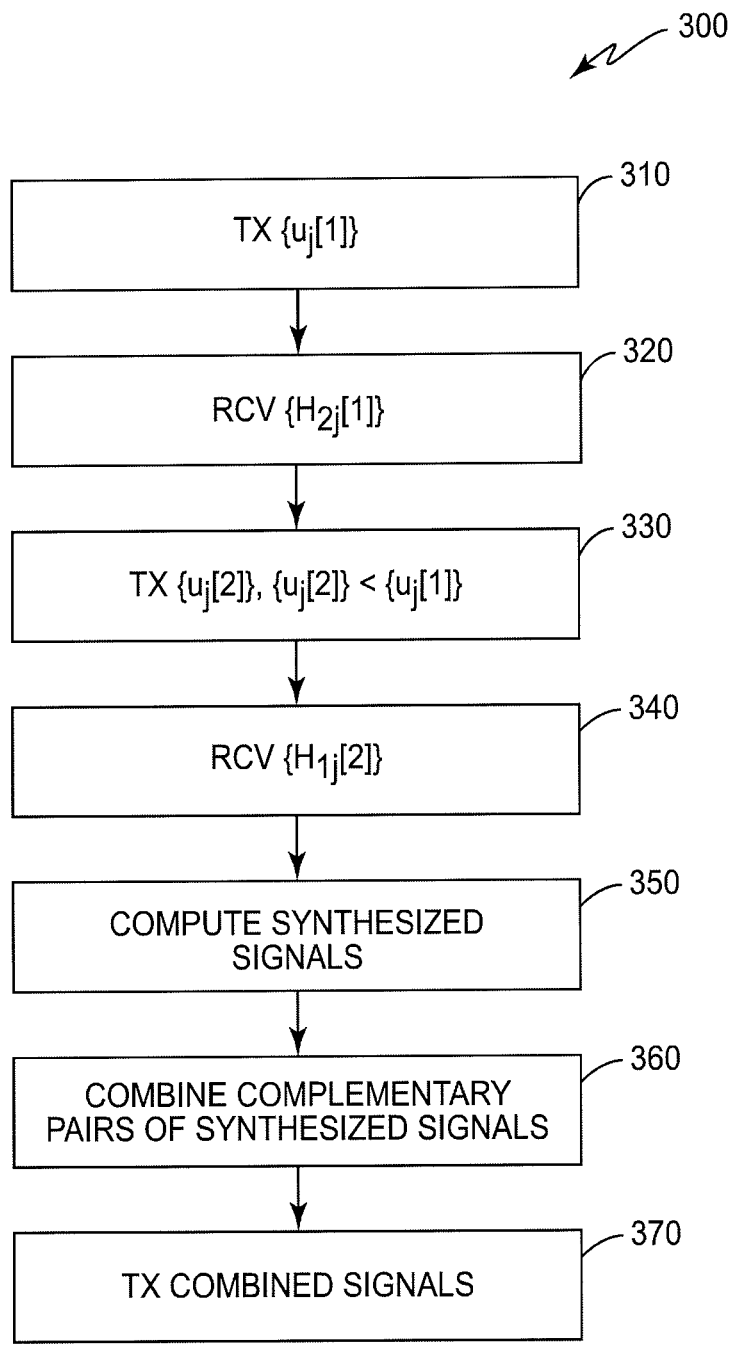
FIG. 3 shows a process chart for implementing asymmetric resource sharing according to one exemplary embodiment.

FIG. 3 shows a process diagram for a process 300 implemented by the base station 100. While process 300 corresponds to J=2 antennas 110, it will be appreciated that process 300 may be extended to any number of antennas 110. Transmitter 105 transmits a first set of information symbols at a first time $\{u_j[1]\}$, where the first set of information symbols are intended for a first mobile terminal, e.g., mobile terminal 200a (block 310). The receiver 135 receives a first set of channel estimates for the first time from a second mobile terminal $\{H_{2j}[1]\}$, where the first set of channel estimates indicate the channel conditions at the first time between the second mobile terminal, e.g., mobile terminal 200b, and the respective antennas 110 (block 320). Transmitter 105 also transmits a second set of information symbols at a second time $\{u_j[2]\}$, where the second set of information symbols are intended for the second mobile terminal, e.g., mobile terminal 200b (block 330). The receiver 135 receives a second set of channel estimates for the second time from the first mobile terminal $\{H_{1j}[2]\}$, where the second set of channel estimates indicate the channel conditions at the second time between the first mobile terminal, e.g., mobile terminal 200a, and the respective antennas 110 (block 340). Synthesized signal generator 140 computes the synthesized signals based on the first and second sets of information symbols and the received channel estimates, where the synthesized signals represent estimates of signals received by the first and second mobile terminals associated with the first and second times (block 350). Combiner 150 combines complementary pairs of synthesized signals to generate combined signals (block 360). Transmitter 105 then transmits one or more of the combined signals at a subsequent transmission time (block 370).

The asymmetric resource sharing disclosed herein reduces the number of information symbols, and in some cases the number of combined signals, transmitted from the base station 100. For example, in the J=3 antenna example of FIG. 1, assume the transmitter 105 of the base station 100 transmits a first set of information symbols $\{u_j[1]\}=\{u_1[1],u_2[1],u_3[1]\}$ at time T=1, where different information symbols are transmitted from different antennas 110. At times T=2 and T=3, the transmitter 105 transmits second and third sets of information symbols having fewer information symbols than the first set. For example, the second set of information symbols may comprise $\{u_j[2]\}=\{u_1[2],u_2[2]\}$, while the third set of information symbols may comprise $\{u_j[3]\}=\{u_1[3],u_2[3]\}$. Thus, $u_3[2]$ and $u_3[3]$ have been punctured from the conventional sets of information symbols. As a result, transmitter 105 transmits three information symbols intended for mobile terminal 200a at time T=1, each form respective antennas 110, and at respective times T=2 and T=3 transmits two information symbols intended for each of mobile terminals 200b, 200c, respectively, from the first antenna 110a and the second antenna 110b. During times T=2 and T=3, the third antenna 110c does not transmit information symbols.

Note that for this example, while mobile terminal 200a needs to receive two additional synthesized signals to detect its symbols using linear signal processing, mobile terminals 200b, 200c each need only one synthesized signal. Specifically, mobile terminal 200a needs $\hat{r}_2[1]$ and $\hat{r}_3[1]$, as before. However, mobile terminal 200b only needs $\hat{r}_1[2]$ or $\hat{r}_3[2]$, while mobile terminal 200c only needs $\hat{r}_1[3]$ or $\hat{r}_2[3]$ to detect symbols using linear signal processing techniques. It is desirable to use the same complementary pairing for the combined signal as in Equation (4), and to minimize the number of channel uses. Equations (5)-(7) show that the number of channel uses can be reduced by only transmitting $u_1[4]$ and $u_1[5]$, and in effect puncturing $u_1[6]$. The three mobile terminals 200 can then proceed as before, to obtain their desired virtual antenna signals. The transmitter 105 may handle the punctured combined symbols, e.g., $u_1[6]$, in the same way as it does the punctured information symbols. That is, the transmitter 105 may generate the punctured combined symbols as dummy symbols and then puncture them. Alternatively, the transmitter 105 may generate the punctured combined symbols from the corresponding punctured information symbols and then puncture them. In another example, the transmitter 105 may not generate the combined symbols at all.

In this J=3 example, two information symbols and one combined signal are punctured, resulting in individual rates of $\rho_1=3/5$ and $\rho_2=\rho_3=2/5$. Thus, mobile terminal 200a benefits from asymmetric resource sharing, in comparison to conventional systems, whereas mobile terminals 200b, 200c suffer. The overall rate is R=7/5, which is slightly less than that achieved with conventional symmetric resource sharing. Compared to symmetric non-cooperative systems, however, the disclosed asymmetric resource sharing achieves a higher overall rate and also higher individual rates for all mobile terminals.

It will be appreciated that it does not matter which mobile terminal's information symbols get punctured. The resulting design is equivalent. For simplicity, the remainder of the disclosure describes different embodiments in terms of information symbols punctured "from the bottom right." It will be appreciated, however, that such an approach is not required.

Conventional symmetric resource sharing for J=4 antennas transmits sixteen information symbols and six combined signals, requiring ten channel uses (i.e., transmission times) in total, resulting in an individual rate of $\rho=2/5$, and an overall rate of R=8/5. The asymmetric resource sharing disclosed herein may also be generalized to J=4 antennas by puncturing the $u_4[3]$ and $u_4[4]$ information symbols, for example. While not required, the J=4 example may also puncture the combined value $\hat{r}_3[4]+\hat{r}_4[3]$. In this example, transmitter 105 transmits fourteen information symbols and five combined signals, requiring nine channel uses in total, resulting in individual rates of $\rho_1=\rho_2=4/9$ and $\rho_3=\rho_4=1/3$, and an overall rate of R=14/9. When compared with conventional symmetric resource sharing, two of the mobile terminals 200 benefit, while the other two mobile terminals 200 suffer, as does the overall rate.

In an alternative implementation of asymmetric resource sharing where J=4, the base station 100 punctures $u_4[2]$, $u_4[3]$, $u_3[4]$ and $u_4[4]$, and may further puncture the combined values $\hat{r}_3[4]+\hat{r}_4[3]$ and $\hat{r}[4]+\hat{r}_4[2]$. In this case, the base station 100 transmits twelve information symbols and four combined signals, requiring eight channel uses in total, resulting in individual rates of $\rho_1=1/2$, $\rho_2=\rho_3=3/8$, and $\rho_4=1/4$, and an overall rate of R=3/2. In comparison with conventional symmetric resource sharing, one mobile terminal 200 benefits, while the remaining three mobile terminals 200 suffer, as does the overall rate. In comparison to the first J=4 implementation of asymmetric resource sharing, three mobile terminals 200 benefit, and one mobile terminal 200 suffers, as does the overall rate.

The asymmetric resource sharing may be further generalized for any value of J, where the base station 100 may puncture information symbols $u_J[J-1]$ and $u_J[J]$, and combined signal $\hat{r}_{J-1}[J]+\hat{r}_J[J-1]$. The total rate for this example is given by:

$$R = \frac{J^2 - 2}{J(J+1)/2 - 1}, \quad (13)$$

where the individual rate for i<J−1 is given by:

$$\rho_i = \frac{J}{J(J+1)/2 - 1}, \quad (14)$$

and the individual rate for the remaining mobile terminals is given by:

$$\rho_{J-1} = \rho_J = \frac{J - 1}{J(J+1)/2 - 1}. \quad (15)$$

Alternatively, for a general value of J, the base station 100 may puncture information symbols $u_J[J-2], u_J[J-1]$, $u_{J-1}[J]$ and $u_J[J]$, and combined signals $\hat{r}_{J-1}[J]+\hat{r}_J[J-1]$ and $\hat{r}_{J-2}[J]+\hat{r}_J[J-2]$. The total rate for this example is given by:

$$R = \frac{J^2 - 4}{J(J+1)/2 - 2}, \quad (16)$$

and the individual rate for i<J−2 is given by:

$$\rho_i = \frac{J}{J(J+1)/2 - 2}, \quad (17)$$

and the individual rate for the remaining mobile terminals is given by:

$$\rho_J = \frac{J-2}{J(J+1)/2 - 2}. \quad (18)$$

The design ideas presented herein can be extended in a natural way. That is, the base station 100 may puncture information symbols in pairs, such that the pairing efficiency of Equation (4) is maintained. Puncturing more symbols from non-prioritized terminals increases the transmission rate to one or more prioritized terminals.

Note that in some embodiments, at least one antenna 110 does not transmit information symbols or pilot symbols. For example, if the third antenna 110c does not transmit information or pilot symbols, channel estimates $H_{i3}[2]$ and $H_{i3}[3]$ are unknown for all mobile terminals 200. Consequently, the mobile terminals 200 cannot feed back these channel estimates. This inability to feed back channel estimates necessarily reduces the amount of channel feedback required of the mobile terminals 200. It will be appreciated that the base station 100 can still synthesize the required signals because the punctured information symbols eliminate the need for the missing channel estimates.

In other embodiments, the base station 100 transmits pilot symbols from the third antenna 110c even when the third antenna 110c does not transmit information symbols. This feature is important for systems where the base station 100 may have a need to know these channel estimates for purposes unrelated to the asymmetrical virtual diversity reception disclosed herein. For example, base station 100 may use knowledge of the channel estimates from all of the transmit antennas 110 to estimate the average channel strength, and/or to predict which antennas 110 should be chosen for future transmissions. For example, the base station 100 may predict that the second and third antennas 110b, 110c yield larger channel estimates than the first antenna 110a, and therefore, that the first antenna 110a should be silenced in future punctured transmissions. Even in this embodiment, channel feedback may be reduced. For example, base station 100 may transmit pilots periodically (instead of every transmission time), according to some predetermined schedule, and/or the mobile terminals 200 may feed back channel estimates according to another periodic schedule.

While not required, certain synthesized signal pairings reduce the efficiency of the asymmetric virtual antenna diversity. For example, when J=3 puncturing an odd number of information symbols, e.g., only $u_3[3]$, causes mobile terminals 200a and 200b to each need two synthesized signals, while causing mobile terminal 200c to only need one synthesized signal. This implementation would leave one value unpaired, which would result in an inefficiency in the additional combined signal transmissions. In another example, inefficiencies result when punctured information symbols lead to unpairable combinations. For example, suppose $u_2[3]$ and $u_3[3]$ are punctured. Now mobile terminals 200a and 200b each need two synthesized signals, while mobile terminal 200c needs none. As a result, $\hat{r}_3[1]$ and $\hat{r}_3[2]$ are unpairable, according to Equation (4) because their counterparts $\hat{r}_1[3]$ and $\hat{r}_2[3]$ are not needed. The examples discussed herein focus on puncturing schemes where pairings are possible. While the asymmetric resource sharing disclosed herein still works when other puncturing schemes are used, they will not be as efficient.

Virtual diversity reception is described herein in terms of symbols. It will be appreciated, however, that a symbol may in fact represent a block of multiple symbols, such as in the time, frequency, or code domains, or any combination thereof. In theory, all symbols in a block experience the same channel.

Moreover, the above details assume that the mobile terminals 200 estimate the channel accurately. Without much loss of generality, we further assume that base station 100 incorporates a pilot signal with each symbol or block of symbols, to facilitate channel estimation at the mobile terminal 200. The pilot signal may take on any form of known information, such as known symbol values in time, frequency, code or domains, or any combination thereof. In particular, mobile terminal 200 is able to handle the combined channel transmission by first estimating $H_{11}[4]$ in Equation (8) using the pilot in combined signal $u_1[4]$, which enables base station 100 to do the subtraction step in Equation (9). Subsequently, base station 100 can estimate the product channel $H'_{2j}[1]$ in Equation (10) using the pilot in information symbol $u_j[1]$.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of asymmetric resource sharing implemented at a network node to create one or more virtual antennas for one or more of a plurality of mobile terminals, the method comprising:

transmitting, at a first time, a first set of information symbols intended for a first mobile terminal from a plurality of antennas, wherein each symbol in the first set of information symbols is transmitted from a different one of the plurality of antennas;

receiving a first set of channel estimates indicating channel conditions at said first time between a second mobile terminal and the respective antennas;

transmitting, at a second time, a second set of information symbols intended for the second mobile terminal from the plurality of antennas, wherein the second set of information symbols comprises fewer information symbols than the first set of information symbols, and wherein each symbol in the second set of information symbols is transmitted from a different one of the plurality of antennas;

receiving a second set of channel estimates indicating channel conditions at said second time between the first mobile terminal and the respective antennas;

computing at least two synthesized signals based on the first and second sets of information symbols and the corresponding first and second sets of channel estimates, said synthesized signals comprising estimates of signals received by the first and second mobile terminals at the first and second times;

combining a first complementary pair of the synthesized signals to generate a first combined signal, wherein combining the first complementary pair comprises combining the synthesized signal associated with the first time and the second mobile terminal with the synthesized signal associated with the second time and the first mobile terminal to generate the first combined signal;

transmitting the first combined signal from one of the plurality of antennas to create one or more virtual antennas for diversity reception by the plurality of mobile terminals;

transmitting, at a third time, a third set of symbols intended for a third mobile terminal from the plurality of antennas, wherein the third set of information symbols comprises fewer information symbols than the first set of information symbols, and wherein each symbol in the third set of information symbols is transmitted from a different one of the plurality of antennas;

receiving a third set of channel estimates indicating channel conditions at said third time between the first mobile terminal and the respective antennas and between the second mobile terminal and the respective antennas;

wherein the first set of channel estimates further indicate channel conditions at said first time between the third mobile terminal and the respective antennas, and wherein the second set of channel estimates further indicate channel conditions at said second time between the third mobile terminal and the respective antennas; and wherein computing at least two synthesized signals further comprises computing the synthesized signals based on the third set of information symbols and the corresponding channel estimates, said synthesized signals comprising estimates of signals received by the first, second, and third mobile terminals at the first, second, and third times; and combining a second complementary pair of the synthesized signals by combining the synthesized signal associated with the first time and the third mobile terminal with the synthesized signal associated with the third time and the first mobile terminal to generate a second combined signal, and transmitting the second combined signal to create two virtual antennas for diversity reception by the first mobile terminal, and to create the one or more virtual antennas for diversity reception by each of the second and third mobile terminals to enable each of the first, second, and third mobile terminals to detect its corresponding symbols transmitted at the respective first, second, and third times, wherein the first combined signal is transmitted at a fourth time and the second combined signal is transmitted at a fifth time, and wherein the fourth and fifth times occur after the third time.

2. The method of claim 1 wherein at least one of the plurality of antennas is silenced at the second time such that the silenced antenna does not transmit information symbols at the second time.

3. The method of claim 2 further comprising transmitting, at the second time, a pilot symbol from the silenced antenna.

4. The method of claim 1 wherein a sum of the difference between the number of information symbols in the first and second sets of information symbols and the difference between the number of information symbols in the first and third sets of information symbols comprises an even number.

5. The method of claim 1 wherein at least one of the antennas is silenced at the second and third times such that the silenced antenna does not transmit information symbols at the second and third times.

6. The method of claim 5 further comprising transmitting, at one or more of the second and third times, a pilot symbol from the silenced antenna.

7. The method of claim 1 further comprising determining the number of information symbols in the first and second sets of information symbols based on one or more performance goals for the first and second mobile terminals.

8. The method of claim 7 wherein the one or more performance goals comprise a data rate.

9. A network node configured for asymmetric resource sharing to create one or more virtual antennas for one or more of a plurality of mobile terminals, the network node comprising:

an information symbol generator configured to generate a first set of information symbols intended for a first mobile terminal and a second set of information symbols intended for a second mobile terminal, wherein the second set of information symbols comprises fewer information symbols than the first set of information symbols;

a transmitter to transmit, at a first time, the first set of information symbols from a plurality of antennas, and to transmit, at a second time, the second set of information symbols from the plurality of antennas, wherein each symbol in the first set of information symbols is transmitted from a different one of the plurality of antennas, and wherein each symbol in the second set of information symbols is transmitted from a different one of the plurality of antennas;

a receiver to receive a first set of channel estimates indicating channel conditions at said first time between the second mobile terminal and the respective antennas, and to receive a second set of channel estimates indicating channel conditions at said second time between the first mobile terminal and the respective antennas;

a synthesized signal generator configured to compute at least two synthesized signals based on the first and second sets of information symbols and the corresponding first and second sets of channel estimates, said synthesized signals comprising estimates of signals received by the first and second mobile terminals associated with the first and second times;

a combiner to combine a first complementary pair of the synthesized signals to generate a first combined signal, wherein the combiner combines the complementary pair by combining the synthesized signal associated with the first time and the second mobile terminal with the synthesized signal associated with the second time and the first mobile terminal to generate the first combined signal;

wherein the transmitter is further configured to transmit the first combined signal from one of the antennas to create one or more virtual antennas for diversity reception by the plurality of mobile terminals;

wherein the information symbol generator is further configured to generate a third set of information symbols intended for a third mobile terminal, wherein the third set of information symbols comprises fewer information symbols than the first set of information symbols;

wherein the transmitter is further configured to transmit, at a third time, the third set of symbols from the plurality of antennas, wherein each symbol in the third set of information symbols is transmitted from a different one of the plurality of antennas;

wherein the receiver is further configured to receive a third set of channel estimates indicating channel conditions at said third time between the first mobile terminal and the respective antennas and between the second mobile terminal and the respective antennas;

wherein the first set of channel estimates further indicate channel conditions at said first time between the third mobile terminal and the respective antennas, and wherein the second set of channel estimates further indicate channel conditions at said second time between the third mobile terminal and the respective antennas;

wherein the synthesized signal generator is further configured to compute the synthesized signals based on the third set of information symbols and the corresponding channel estimates, said synthesized signals comprising estimates of signals received by the first, second, and third mobile terminals at the first, second, and third times;

wherein the combiner is further configured to combine the synthesized signal associated with the first time and the third mobile terminal with the synthesized signal associated with the third time and the first mobile terminal to generate a second combined signal; and wherein the transmitter is further configured to transmit the second combined signal to create two virtual antennas for diversity reception by the first mobile terminal, and to create the one or more virtual antennas for diversity reception by each of the second and third mobile terminals to enable each of the first, second, and third mobile terminals to detect the corresponding symbols transmitted at the respective first, second, and third times, wherein the first combined signal is transmitted at a fourth time and the second combined signal is transmitted at a fifth time, and wherein the fourth and fifth times occur after the third time.

10. The network node of claim 9 wherein at least one of the antennas is silenced at the second time such that the silenced antenna does not transmit information symbols at the second time.

11. The network node of claim 10 wherein the transmitter is further configured to transmit, at the second time, a pilot symbol from the silenced antenna.

12. The network node of claim 9 wherein a sum of the difference between the number of information symbols in the first and second sets of information symbols and the difference between the number of information symbols in the first and third sets of information symbols comprises an even number.

13. The network node of claim 9 wherein at least one of the antennas is silenced at the second and third times such that the silenced antenna does not transmit information symbols at the second and third times.

14. The network node of claim 13 wherein the transmitter is further configured to transmit, at one or more of the second and third times, a pilot symbol from the silenced antenna.

15. The network node of claim 9 wherein the number of antennas equals the number of mobile terminals.

16. The network node of claim 9 further comprising a controller configured to determine the number of information symbols in the first and second sets of information symbols based on one or more performance goals for the first and second mobile terminals.

17. The network node of claim 16 wherein the one or more performance goals comprise a data rate.

* * * * *

UNITED STATES PATENT AND TRADEMARK OFFICE
CERTIFICATE OF CORRECTION

PATENT NO. : 8,750,913 B2
APPLICATION NO. : 13/324645
DATED : June 10, 2014
INVENTOR(S) : Khayrallah et al.

It is certified that error appears in the above-identified patent and that said Letters Patent is hereby corrected as shown below:

Specification

In Column 5, Line 5, delete "[1.]" and insert -- [1] --, therefor.

In Column 5, Line 7, delete "[1.]" and insert -- [1] --, therefor.

In Column 5, Line 9, delete "[1.]" and insert -- [1] --, therefor.

Signed and Sealed this
Sixteenth Day of February, 2016

Michelle K. Lee
*Director of the United States Patent and Trademark Office*